Aug. 3, 1943.  E. F. HUDDLE  2,325,857
HARVESTING MACHINE
Filed May 27, 1942  2 Sheets-Sheet 1

Inventor:
Edwin F. Huddle.
By Paul Pippel
Atty.

Inventor:
Edwin F. Huddle

Patented Aug. 3, 1943

2,325,857

UNITED STATES PATENT OFFICE 2,325,857

HARVESTING MACHINE

Edwin F. Huddle, Elmwood Park, Ill., assignor to International Harvester Company, a corporation of New Jersey Application May 27, 1942, Serial No. 444,690

10 Claims. (Cl. 56—185)

This invention relates to a harvesting machine and, more particularly, to improvements in means for conveying harvested material from the harvesting means to a point where such material may be deposited on the ground or otherwise received.

In the usual type of harvester of one particular class to which the invention is especially adapted, a main frame is carried on appropriate ground wheels and means are provided for adjusting the main frame vertically so that the harvesting means, which are carried by the frame, may cut crops at different heights. The ordinary harvesting means operates in conjunction with a conventional platform or apron conveyor which receives cut crops or material from the harvesting means for conveying of such material to a second elevator or conveyor which, in turn, conveys or delivers the cut material to a point remote from the harvesting means. The delivery of such material may be made directly upon the stubble at one side of the harvester or may be otherwise received in some appropriate receptacle. It has been found in prior machines of the type referred to that the arrangement of the elevator or conveyor is such as to be subject to the disadvantage that its delivery end is disposed at different heights according to the adjustment of the main frame as a whole. This is disadvantageous, because the point of delivery then varies with respect to the final disposition on the stubble or other receptacle.

It is accordingly the principal object of the present invention to provide a conveying or elevating machine so mounted with respect to the main frame as to have its delivery end maintained substantially at a uniform position irrespective of adjustment of the main frame.

An important object of the invention is to mount the delivery end of the conveying means on the ground support, so that the main frame, which is ordinarily adjustable with respect to the ground support, is also adjustable with respect to the conveying means.

It is another object of the invention to provide means for mounting the conveying means for swinging movement through an arc which does not substantially vary the height of the delivery end of the conveyor.

Still another object is to provide a delivery chute so arranged with respect to the conveying means as to have its delivery end also maintainable at a substantially uniform height.

And still another object is to provide means whereby the delivery end of the chute may be adjusted if desired.

A complete understanding of the foregoing and other desirable objects and features of the invention may be had from the following detailed description and accompanying sheets of drawings illustrating a preferred embodiment of the invention.

In the drawings—

Figure 1:
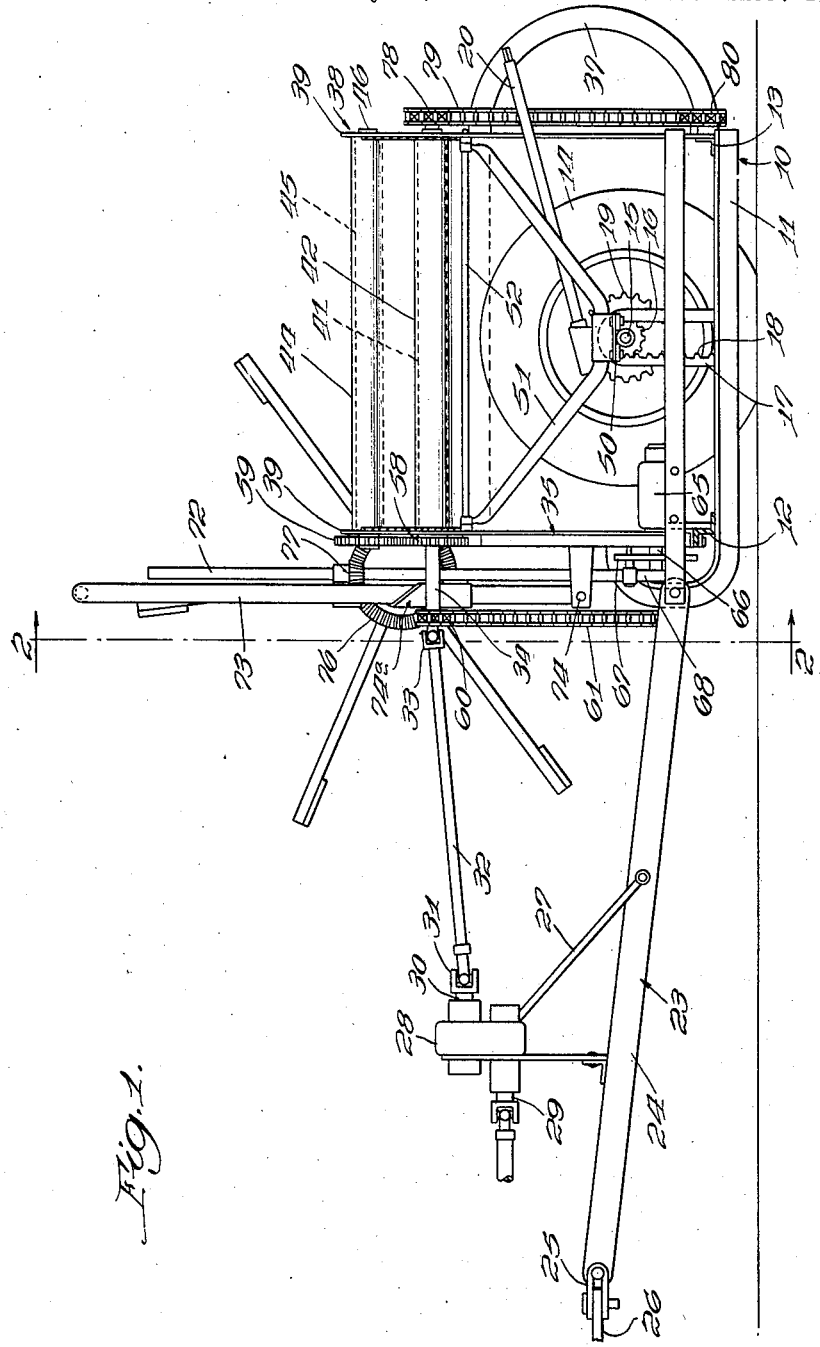
Figure 1 is a side elevational view of a harvesting machine embodying the invention, the final delivery chute being omitted.

The harvesting machine shown for the purposes of illustration comprises a main frame, generally indicated at 10, having a plurality of longitudinally extending frame members 11, only one of which is shown, and a plurality of transversely extending frame members 12 and 13. The frame is supported on a pair of ground wheels, only one of which is shown at 14. The wheel includes a transverse axle 15 which carries for rotation thereon a pinion 16. The main frame 10 is provided with a pair of vertically extending U-shaped supports 17, one on each side of the wheel 14 and at least one of which is provided with a toothed or rack portion 18 engageable with the pinion 16. The axle 15 further carries a worm-wheel 19 engageable in any suitable fashion with a worm on a longitudinally extending shaft 20. The end of the shaft is adapted to receive a crank, not shown, which serves to rotate the shaft for operating the worm and worm-wheel for raising and lowering the main frame with respect to the ground wheel 15. The construction just described is generally conventional and forms no part of the present invention except in so far as it provides part of the structure of the machine to which the invention is adapted.

The front frame member 12 serves to carry in the usual manner a plurality of transversely spaced guards 21 forming part of the harvesting mechanism that is carried by the main frame. This mechanism may also be conventional and includes a reciprocating knife 22 which is reciprocated in a manner that will presently appear.

The type of machine illustrated is adapted to be drawn by a tractor and for that purpose is provided with a longitudinally extending hitch frame 23 having a plurality of frame bars 24 connected at their forward ends to a clevis 25. The draft frame may be connected in any suitable manner with the draw-bar of a tractor, not shown, as generally indicated at 26. Adjacent its forward end, the draft frame 23 carries supporting structure 27 serving to mount a gear casing 28. This casing is provided with suitable gearing and provides means whereby power may be transmitted from a shaft 29 to a shaft 30. The shaft 29 may be suitably adapted to be connected to the power take-off shaft of a tractor, not shown.

The shaft 30 is connected by a universal joint 31 to a longitudinally rearwardly extending shaft 32. This shaft is, in turn, connected by a universal joint 33 to a shaft 34 which serves as the upper roller shaft of the elevating or conveying means to be presently described.

Figure 2:
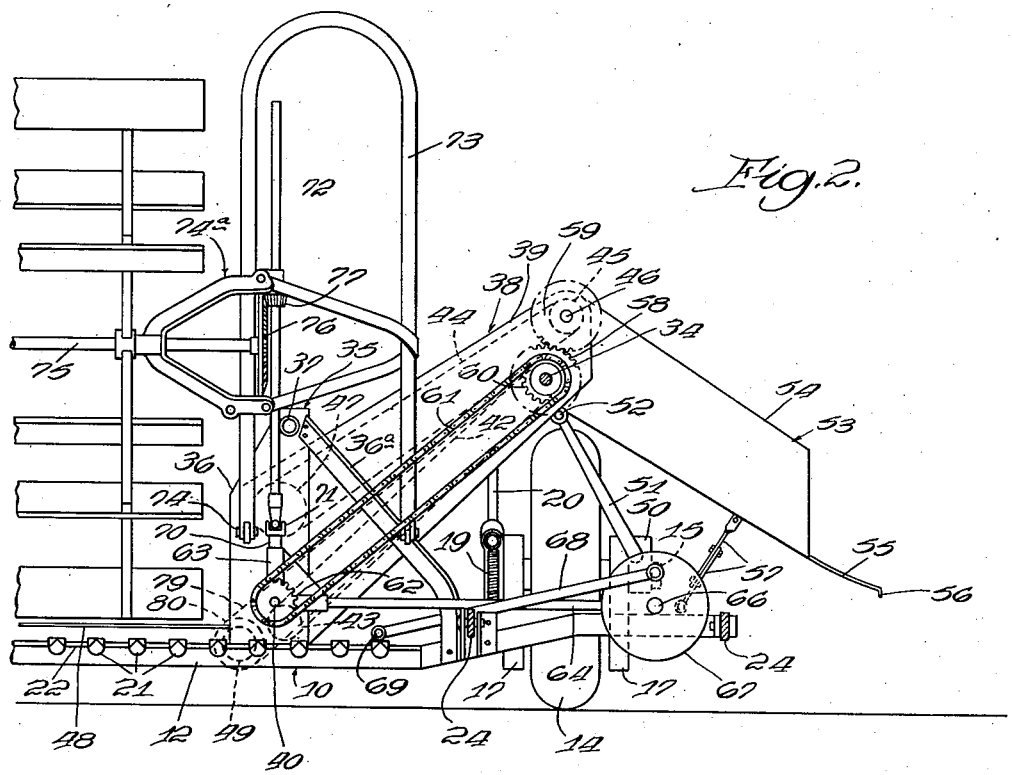
Figure 2 is a front elevational view of the structure shown in Figure 1, the view being taken substantially along the line 2—2 of Figure 1.

As best shown in Figure 2, the front frame 12 of the main frame 10 is provided with upstanding supporting structure generally indicated at 35. This structure comprises a vertical plate 36 and a brace bar 36a. The plate 35 is rigidly secured to the forward end of a longitudinally extending, tubular support 37, the rearward and lower end of this support being connected to the rear end of the main frame 10.

The conveying or elevating means is generally indicated at 38. This means comprises a pair of longitudinally spaced, upwardly inclined sheets 39 pivoted at their lower ends on a longitudinal axis on a longitudinally extending pivot about a shaft 40. The upper ends of the sheets 39 carry therebetween a driving roller 41, about which is trained an elevator or conveyer canvas 42. The lower end of the canvas is trained about a lower roller 43. The conveyer means further includes an upper elevator canvas 44 trained about an upper roller 45 on a shaft 46 and a lower roller 47. A transversely running apron or platform conveyer 48 operates rearwardly of the cutting mechanism comprising the guards 21 and the knife 22 and is adapted to receive cut material from the cutting mechanism in the usual manner. One end of the platform apron 48 is trained about a roller 49 disposed in close proximity to the lower roller 43 of the conveyer 38. The elevators 42 and 44 of the conveyer 38 thus operate to pick up material from the platform 48 for the delivery of such material in the usual manner.

As previously stated, the lower end of the conveyer unit 38 is pivoted on the longitudinally extending shaft 40. The conveyer thus has movement with respect to the remainder of the main frame structure. The upper end of the conveyer is located above the ground wheel 14 and is supported in that position by means mounted on a part of the ground wheel. This means comprises a bearing or support 50 carried on the axle 15 of the wheel. This bearing has pivotally connected thereto the lower end of link means in the form of a bail 51. The upper ends or legs of the bail are pivotally connected, as at 52, to a lower portion of the upper end of the conveyer 38. In this manner the lower or inner end of the conveyer is supported on the main frame and the upper outer end of the conveyer is supported on the ground wheel.

A delivery chute 53 is mounted at its inner upper end on the conveyer 38, preferably by means of the pivot 52 previously described. This chute consists of a pair of side sheets 54 and a bottom sheet 55 which extends at its lower end transversely of the outermost portion of the main frame, as indicated at 56. The lower end of the chute 53 is supported on the main frame 10, preferably by means consisting of a pair of adjustable links 57.

As previously described, the gearing in the gear casing 28 drives the upper roller shaft of the conveyer 38. The shaft 34 carries for rotation therewith a gear 58, which meshes with a gear 59 on the shaft 46 of the upper roller 45 of the upper elevator 44. The shaft 34 further carries a driving sprocket 60, about which is trained a drive chain 61. The lower end of the chain is trained about a drive sprocket 62 carried on the shaft 40. The shaft 40 enters a gear-box 63 containing appropriate bevel gearing, not shown, by means of which power may be transmitted to other parts of the harvesting machine. A drive shaft 64 extends transversely from the gear-box 63 toward the ground support 14, adjacent which the main frame 10 carries a gear-box 65. Suitable gearing, not shown, within this gear-box transmits power to a longitudinally extending stub shaft 66 on the outer end of which is mounted a fly-wheel 67. A pitman 68 is connected at one end to the flywheel and, at its other end, to a knife-head 69 on the reciprocating knife 22 of the harvesting mechanism.

A shaft 70 extends vertically from the gear-box 63 and is connected by a universal joint 71 to another vertical shaft 72. This shaft parallels one leg of a vertically extending U-shaped support 73 carried at its lower end at 74 on the supporting structure 35 of the main frame 10. This U-frame carries supporting structure generally indicated at 74 for the mounting of a reel shaft 75. This reel cooperates in the usual manner with the harvesting mechanism. The shaft 75 carries at its stubbleward end a large bevel gear 76, which meshes with a bevel pinion 77 on the vertical shaft 72. In this manner the reel shaft 75 is driven through the gear casing 63 from the upper roller shaft 34 of the elevator 38. As has been previously set forth, the elevating and cutting mechanisms are also driven from this shaft. The rear end of the roller shaft 34 carries a sprocket 78 which, through a drive chain 79, drives a sprocket 80 on the roller 49 of the platform apron 48.

In the operation of the machine ordinary procedure is followed. By means of the worm-wheel and rack and pinion mechanism previously described, the height of the cutting mechanism may be adjusted with respect to the ground. In Figure 2, the main frame is lowered to a position in which the cutting mechanism operates at a comparatively low height. It will be noted that the delivery end 56 of the delivery chute 53 is disposed at a height above the ground at which delivery of the harvested material may be conveniently made on top of standing stubble.

Figure 3:
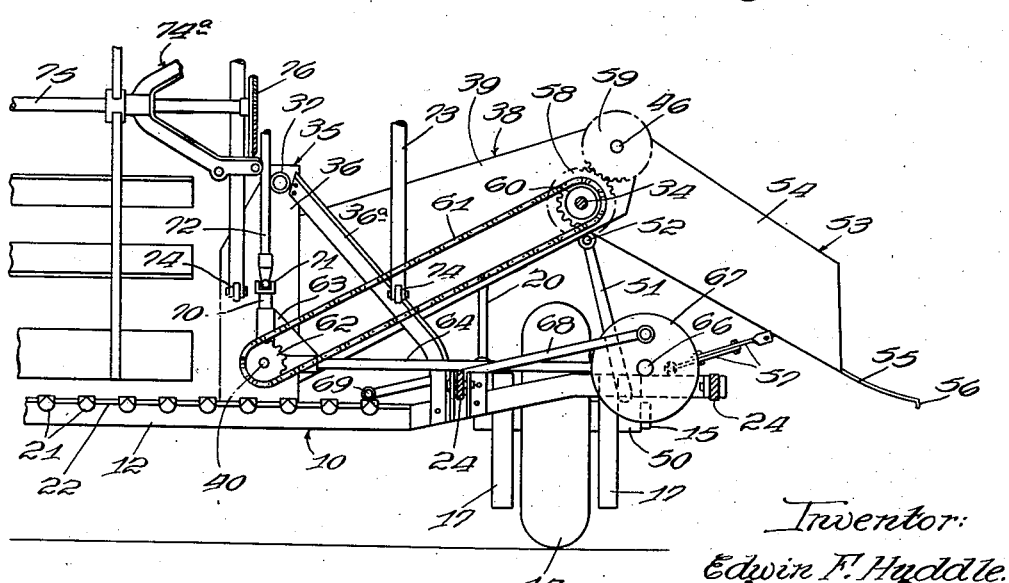
Figure 3 is a view similar to that in Figure 2 but showing the arrangement of parts upon adjustment of the main frame of the machine.

As shown in Figure 3, the main frame has been moved vertically upwardly so that the cutting mechanism is disposed at substantially its maximum height above the ground. Because of the novel supporting arrangement of the conveyer 38 and delivery chute 53, the delivery ends of these means have not varied substantially during adjustment of the main frame and cutting mechanism. Upon adjustment of the main frame, the inner end of the conveyer 38, of course, moves upwardly. It will be noted, however, that the upper or outer end of the conveyer 38, being mounted on the axle of the ground support 14, is maintained at substantially its original height. Movement of the outer end of the conveyer 38 is rather outwardly or laterally about an arc having as its center the lower pivotal support of the bail or supporting member 51. Similarly, the discharge end 56 of the delivery chute 53 is moved laterally and substantially not at all vertically. This result follows from the cooperation between the mounting of the inner end of the chute on the conveyer 38 and the support of the outer end of the chute on the main frame by means of the adjustable links 57. If desired, the discharge end of the chute may be disposed at different heights by means of the adjustment provided between the link or supporting means 57. Ordinarily, however, it may not be desired to make such adjustment, for, as will be noted, the difference between the ground and the delivery end of the chute in Figure 2 and in Figure 3 is very slight.

Because of the novel supporting arrangement for the conveyer and chute, a substantially uniform height is maintained for the delivery of cut material. In the event that it is desired to utilize a receptacle in place of the chute 53, it will be noted that the upper end of the conveyer 38 may be maintained at a substantially uniform height. When the chute 53 is used, as shown, the delivery end thereof is also maintained at a substantially uniform height for the deposition of material directly upon standing stubble.

It will be seen from the foregoing description that the improved supporting means for the conveyer and chute achieves the desirable results heretofore enumerated. Numerous features and advantages of the invention will be apparent to those skilled in the art. It will be understood, of course, that only a preferred embodiment of the invention has been illustrated and described and that numerous modifications and alterations may be made therein without departing from the spirit and scope of the invention as defined in the appended claims.

What is claimed is:

1. In a harvesting machine having a ground support, a frame, means mounting the frame on the ground support for vertical adjustment with respect to the ground support, and harvesting means carried by the frame, the combination therewith of conveying means for receiving harvested material from the harvesting means and for delivering said material to a point remote from the harvesting means, means mounting one end of the conveying means on the frame for adjustment of said end vertically with the frame, and means mounting another portion of said conveying means on the ground support, whereby said last named portion is maintained substantially in uniform position irrespective of adjustment of the frame.

2. In a harvesting machine having a ground support, a frame, means mounting the frame on the ground support for vertical adjustment with respect to the ground support, and harvesting means carried by the frame, the combination therewith of conveying means for receiving harvested material from the harvesting means and for delivering said material to a point remote from the harvesting means, means mounting one end of the conveying means on the frame for adjustment of said end vertically with the frame, means mounting another portion of said conveying means on the ground support, whereby said last named portion is maintained substantially in uniform position irrespective of adjustment of the frame, discharge means for receiving material from the conveying means, means connecting the discharge and conveying means, and means connecting the discharge means and the frame.

3. In a harvesting means having a ground support, a transverse frame, means mounting the frame on the ground support for vertical adjustment, and harvesting means carried by the frame, the combination therewith of a transverse conveyer having one end disposed to receive material from the harvesting means and extending over the ground support with its other end disposed to discharge material received, means pivotally mounting the first end of the conveyer on the frame, link means pivoted at one end to the ground support for transverse swinging movement, and means connecting the other end of the link means to the conveyer adjacent its discharge end, whereby the discharge end of said conveyer has movement transversely at a substantially uniform height irrespective of vertical adjustment of the frame.

4. In a harvesting means having a ground support, a transverse frame, means mounting the frame on the ground support for vertical adjustment, and harvesting means carried by the frame, the combination therewith of a transverse conveyer having one end disposed to receive material from the harvesting means and extending over the ground support with its other end disposed to discharge material received, means pivotally mounting the first end of the conveyor on the frame, link means pivoted at one end to the ground support for transverse swinging movement, means connecting the other end of the link means to the conveyer adjacent its discharge end, whereby the discharge end of said conveyer has movement transversely at a substantially uniform height irrespective of vertical adjustment of the frame, a discharge chute pivoted at one end at the discharge end of the conveyer, and link means pivoted at opposite ends to the chute and to the frame for transverse movement with the conveyer at a substantially uniform height.

5. In a harvesting means having a ground support, a transverse frame, means mounting the frame on the ground support for vertical adjustment, and harvesting means carried by the frame, the combination therewith of a transverse conveyer having one end disposed to receive material from the harvesting means and extending over the ground support with its other end disposed to discharge material received, means pivotally mounting the first end of the conveyer on the frame, link means pivoted at one end to the ground support for transverse swinging movement, means connecting the other end of the link means to the conveyer adjacent its discharge end, whereby the discharge end of said conveyer has movement transversely at a substantially uniform height irrespective of vertical adjustment of the frame, a discharge chute pivoted at one end at the discharge end of the conveyer, link means pivoted at opposite ends to the chute and to the frame for transverse movement with the conveyer at a substantially uniform height, and means for adjusting the chute vertically with respect to the frame and conveyer.

6. In a harvesting means having a ground support, a frame, means mounting the frame on the ground support for vertical adjustment, and harvesting means carried by the frame, the combination therewith of a conveyer having one end disposed to receive material from the harvesting means and its other end disposed to discharge material received, means pivotally mounting the first end of the conveyer on the frame on an axis transversely of the frame, link means pivoted at one end to the ground support on an axis paralleling the aforesaid axis for swinging movement, and means connecting the other end of the link means to the conveyer adjacent its discharge end, whereby the discharge end of said conveyer has translational movement at a substantially uniform height irrespective of vertical adjustment of the frame.

7. In a harvesting machine having a ground support, a frame, means mounting the frame on the ground support for vertical adjustment with respect to the ground support, and harvesting means carried by the frame, the combination therewith of conveying means for receiving harvested material from the harvesting means and for delivering said material to a point remote from the harvesting means, means mounting one end of the conveying means on the frame, and means arranged to support another portion of said conveying means at a substantially uniform height irrespective of adjustment of the frame.

8. In a harvesting machine having a ground support, a frame, means mounting the frame on the ground support for vertical adjustment with respect to the ground support, and harvesting means carried by the frame, the combination therewith of conveying means for receiving harvested material from the harvesting means and for delivering said material to a point remote from the harvesting means, means mounting one end of the conveying means on the frame, means arranged to support another portion of said conveying means at a substantially uniform height irrespective of adjustment of the frame, discharge means for receiving material from the conveying means and for discharging said material over the ground support, and means adjustably supporting said discharge means on the frame.

9. In a harvesting machine having a ground support, a frame, means mounting the frame on the ground support for vertical adjustment with respect to the ground support, and harvesting means carried by the frame, the combination therewith of conveying means for receiving harvested material from the harvesting means and for delivering said material to a point remote from the harvesting means, means mounting one end of the conveying means on the frame, means arranged to support another portion of said conveying means at a substantially uniform height irrespective of adjustment of the frame, discharge means for receiving material from the conveying means and for discharging said material over the ground support, and means arranged to support said discharge means for vertical adjustment with respect to the conveying means.

10. In a harvesting machine having a ground wheel including a transverse axle, a transverse frame, means mounting the frame on the axle for vertical adjustment, and harvesting means carried by the frame, the combination therewith of a conveyer pivoted at one end to the frame on an axis at right angles to the transverse extent of the frame and adjacent the harvesting means, a bearing on the axle, and a support connected between the bearing and the other end of the conveyer.

EDWIN F. HUDDLE.